United States Patent
Hiti et al.

(10) Patent No.: US 6,362,585 B1
(45) Date of Patent: Mar. 26, 2002

(54) CONTROLLING ELECTRIC VEHICLE DC BUS VOLTAGE RIPPLE UNDER STEP MODE OF OPERATION

(75) Inventors: Silva Hiti, Torrance, CA (US); Brendan Matthew Conlon, Royal Oak, MI (US); Constantin C. Stancu, Anaheim, CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/584,799

(22) Filed: May 30, 2000

(51) Int. Cl.[7] .................................................. H02P 6/00
(52) U.S. Cl. ........................ 318/430; 318/434; 318/599; 363/37; 363/41
(58) Field of Search ................................. 318/138, 139, 318/245, 254, 599, 430–439, 722, 716, 808, 798; 363/37, 41, 40, 43, 16, 27

(56) References Cited

U.S. PATENT DOCUMENTS

| | | | |
|---|---|---|---|
| 3,781,616 A | * 12/1973 | Mokrytzki et al. | ......... 318/415 |
| 4,626,763 A | * 12/1986 | Edwards | ...................... 318/811 |
| 5,027,264 A | *  6/1991 | DeDoncker et al. | .......... 363/16 |
| 5,057,760 A | * 10/1991 | Dadpey et al. | .............. 318/807 |
| 5,552,977 A | *  9/1996 | Xu et al. | ........................ 363/41 |
| 5,602,452 A | *  2/1997 | Underhill | ...................... 318/439 |
| 5,657,216 A | *  8/1997 | Kaura | ........................... 363/41 |
| 5,706,186 A | *  1/1998 | Blasko | ......................... 363/41 |
| 5,736,825 A | *  4/1998 | Kaura et al. | ................. 318/599 |
| 5,739,664 A | *  4/1998 | Deng et al. | .................. 318/808 |
| 6,043,995 A | *  3/2000 | Leuthen | ......................... 363/37 |
| 6,163,128 A | * 12/2000 | Hiti et al. | ..................... 318/722 |
| 6,288,515 B1 | *  9/2001 | Hiti et al. | ..................... 318/722 |

* cited by examiner

*Primary Examiner*—Paul Ip
(74) *Attorney, Agent, or Firm*—Anthony Luke Simon

(57) ABSTRACT

A control system and method for controlling an inverter used in an electric vehicle. The control system and method measures an average DC bus voltage and compares it to low voltage and high voltage thresholds defining predetermined conditions. If the voltage conditions are satisfied, the six-step mode is enabled based upon an applied torque command. Thus, if the torque command is higher than a high torque threshold, the six-step mode indefinitely enabled, and if the torque command is below the high torque threshold, the six-step mode is enabled for a limited time duration, and then disabled.

4 Claims, 1 Drawing Sheet

CONTROLLING ELECTRIC VEHICLE DC BUS VOLTAGE RIPPLE UNDER STEP MODE OF OPERATION

BACKGROUND

The present invention relates generally to electric vehicles, and more particularly, to a system and method for controlling DC bus voltage ripple when using a six-step (or other step) mode of operation to control inverters used in electric vehicles and hybrid electric vehicles.

The assignee of the present invention designs and develops electric vehicle charging propulsion systems. In electric vehicle and hybrid electric vehicle applications, different subsystems can be connected to the same high-voltage bus. If a subsystem draws or sinks a large current ripple component, the DC bus voltage ripple can become substantial. This, in turn, can consequently cause faulty operation of other DC bus supplied subsystems.

The main cause of high ripple current on the DC bus is the main propulsion inverter. This is especially true using a six-step (or other step) mode of inverter operation, a known method that changes the output of the inverter in discrete steps, causing a large, low-frequency current ripple component to be drawn from the DC bus. This mode of inverter operation is necessary to provide maximal output motor torque. The amount of current ripple drawn from the DC bus can be reduced if large, bulky, low-frequency input filters are placed across the input of the main propulsion inverter. However, this results in a bulky, heavy, and costly power electronics subsystem, which occupies a significant portion of vehicle space.

Another approach is to completely disable the inverter six-step mode of operation when there is substantial DC bus voltage ripple. If the six-step mode is permanently disabled, the maximal achievable torque is significantly reduced, especially at high speeds, and the vehicle acceleration time and overall performance deteriorate significantly. This is not a desirable alternative.

It would therefore be desirable to have a control system and method for controlling DC bus voltage ripple when using a step mode of operation to control inverters used in electric vehicles and hybrid electric vehicles.

SUMMARY OF THE INVENTION

The present invention comprises a system and method for controlling DC bus voltage ripple of an inverter used in an electric or hybrid electric vehicle when using a six-step (or other step) mode of operation to control the inverter.

An exemplary system comprises a torque command input for receiving an applied torque command and a sensor for measuring an average DC bus voltage. A processor compares the average DC bus voltage to low voltage and high voltage thresholds defining predetermined conditions, and conditionally enables the step mode (preferably the six-step mode) based upon the applied torque command if the voltage conditions are satisfied. If, at any time while the voltage conditions are satisfied the torque command is above a high torque threshold, the step mode is indefinitely enabled until the voltage conditions disable the step mode. If the torque command is not above the high torque threshold, the step mode is enabled for a limited time duration, and then disabled after expiration of the limited time duration or after the voltage conditions disable the step mode, whichever occurs first. If disabled due to the voltage conditions not being satisfied, then the step mode will be enabled when the voltage conditions are again satisfied.

An exemplary method comprises the following steps. An average DC bus voltage is measured. The average DC bus voltage is compared to low voltage and high voltage thresholds defining predetermined conditions. If the voltage conditions are satisfied, the step mode is enabled based upon an applied torque command. If the torque command is higher than a high torque threshold, the step mode is indefinitely enabled as long as the voltage conditions remain satisfied. Otherwise, the step mode is enabled for a limited time duration, and then disabled.

As a result of using the present system and method, maximal torque can be produced by the electric motor driven by the main propulsion inverter allowing the six-step mode of operation, without inducing faulty operation of the other power electronics subsystems connected to the same DC bus. Small high-frequency input filter can be used at the inverter input, thus reducing the size and cost of the inverter. Furthermore, by not permanently disabling the six-step mode, the maximal achievable torque may be provided by the inverter, especially at high speeds, and vehicle acceleration time and overall performance is not limited.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
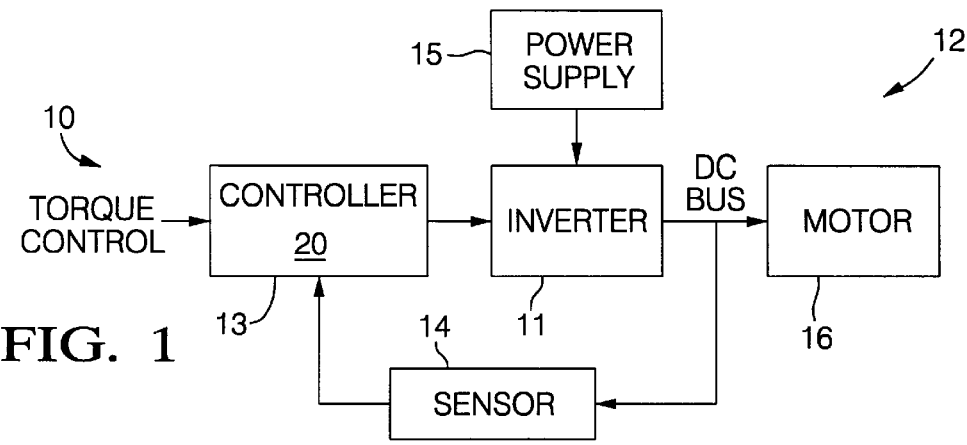
FIG. 1 shows an exemplary control system in accordance with the principles of the present invention for use in controlling an inverter used in an electric or hybrid electric vehicle.

Referring to the drawing figures, FIG. 1 shows an exemplary control system 10 for use in controlling an inverter 11 used in an electric or hybrid electric vehicle 12. A torque command or request is applied to a controller 13 or processor 13 from an operator of the vehicle 12 when its accelerator pedal is depressed. The controller 13 also receives an input signal from a sensor 14 that measures the average DC bus voltage supplied by the inverter 11. The inverter 11 is coupled between a power supply 15 and a motor 16 of the electric or hybrid electric vehicle 12.

Figure 2:
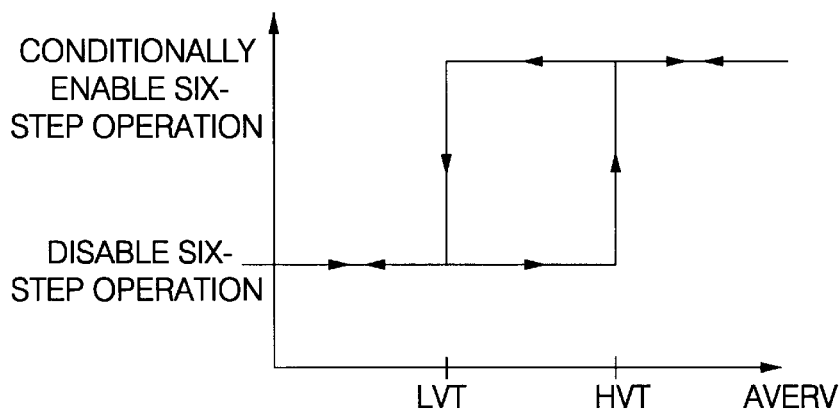
FIG. 2 is a graph that illustrates an exemplary control scheme implanted in the present invention for controlling DC bus voltage ripple of an inverter used in an electric or hybrid electric vehicle when using a six-step mode of operation to control the inverter.
Figure 3:
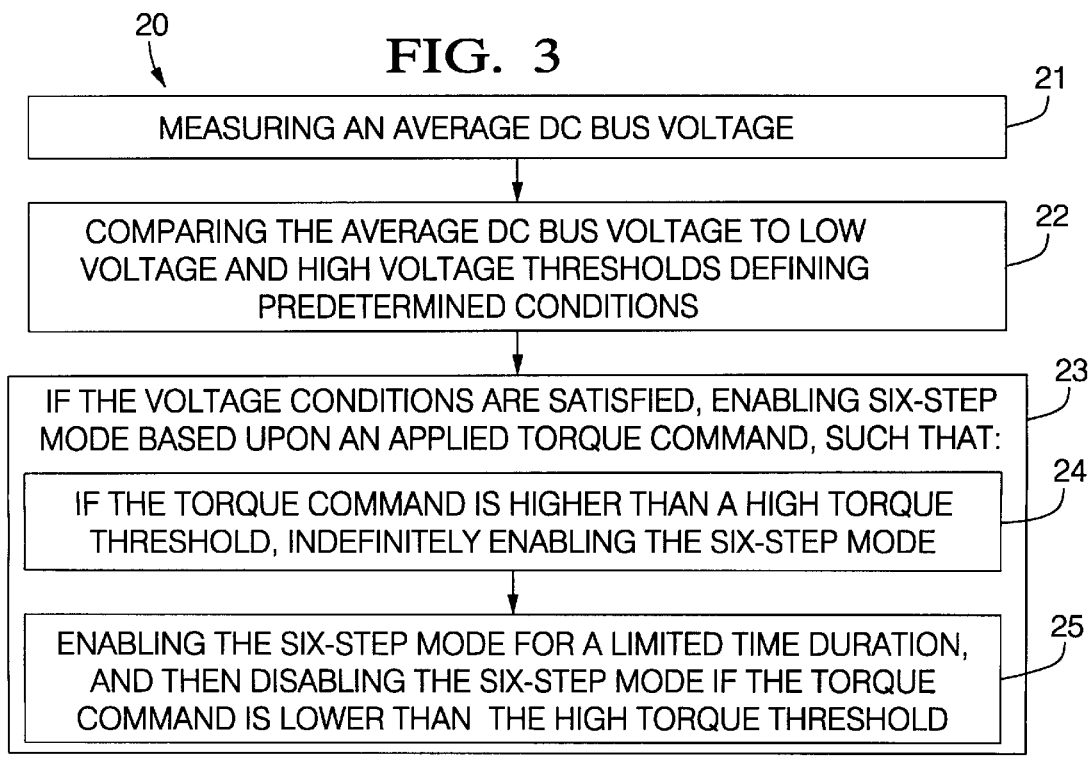
FIG. 3 is a flow diagram illustrating details of an exemplary control method in accordance with the principles of the present invention.

The control system 10 uses a control method 20 that controls DC bus voltage ripple of the inverter 11 used in the electric or hybrid electric vehicle 12 when using a six-step mode to control operation the inverter 11. FIG. 2 is a graph that illustrates the exemplary control method 20. FIG. 3 is a flow diagram illustrating details of the exemplary control method 20.

The present example control system 10 and method 20 optimizes usage of the six-step mode of operation, so that the DC bus voltage ripple is never too excessive. The method 20 measures 21 the average DC bus voltage (AVERV), and compares 22 it to two thresholds comprising a low voltage threshold (LVT), and a high voltage threshold (HVT).

Disabling and conditional enabling the six-step mode is performed according to FIG. 2. When the average DC bus voltage is below the low voltage threshold the six-step mode is disabled. The six-step mode remains disabled when the average DC bus voltage is between the low and high voltage thresholds if (1) the DC bus voltage has transitioned to the range between the low and high voltage thresholds from below the low voltage threshold and has not yet risen above the high voltage threshold or (2) during the previous time interval of the control program, the six-step mode was disabled (this may occur, for example, when the six-step mode is enabled for a limited time period and then disabled as described below). When the average DC bus voltage reaches and is above the high voltage threshold, the six-step mode is conditionally enabled. If the average DC bus voltage transitions from above the high voltage threshold to between the high and low voltage thresholds, the six-step mode is remains conditionally enabled. When the average DC bus voltage reaches and is below the low voltage threshold, the six-step mode is disabled.

If the six-step mode is conditionally enabled because the DC bus voltage satisfies the voltage conditions described above with respect to FIG. 2, the six-step mode is enabled 23 based upon an applied torque command or request (shown as "torque control" in FIG. 1) as follows. If the torque request is not higher than a high torque threshold (HTT), it is assumed that the inverter 11 is in a torque transient mode, tracking a changing torque command, and the six-step mode is enabled 25 for a limited time duration, and then disabled until (1) the torque request rises above the high torque threshold or (2) the average DC bus voltage meets the conditions described above with respect to FIG. 2 to conditionally enable the six-step mode. By enabling the six-step mode for a limited time period during transient conditions when the voltage conditions are met, fast transient response is achieved.

If the torque request is higher than a high torque threshold (HTT), it is assumed that the inverter 11 is to be in a wide open throttle mode in which maximal achievable torque is required, and the six-step mode is indefinitely enabled 24, which means that it is enabled until it is disabled because (1) the average DC bus voltage falls below the low voltage threshold or (2) the torque request falls below the high torque threshold and the limited time duration described above expires.

The control system 10 and method 20 may be used to control voltage source inverter fed AC motor drives required to operate in a six-step mode (or other step mode), such as those employed in electric and hybrid electric vehicles 12. Use of the present invention results in a lower cost inverter 11, a reduced size inverter 11, and improved reliability due to fewer filtering components.

Thus, a system and method for controlling DC bus voltage ripple when using a six-step mode of operation to control inverters used in electric vehicles and hybrid electric vehicles have been disclosed. It is to be understood that the above-described embodiments are merely illustrative of one of the many specific embodiments that represent applications of the principles of the present invention. Clearly, numerous and other arrangements can be readily devised by those skilled in the art without departing from the scope of the invention.

What is claimed is:

1. A method for controlling DC bus voltage ripple of an inverter of an electric vehicle when using a six-step mode of operation to control the inverter, comprising the steps of:
   measuring an average DC bus voltage;
   comparing the average DC bus voltage to low voltage and high voltage thresholds defining predetermined conditions;
   if the voltage conditions are satisfied, enabling the six-step mode based upon an applied torque command, such that:
   if the torque command is higher than a high torque threshold, indefinitely enabling the six-step mode;
   otherwise, enabling the six-step mode for a limited time duration, and then disabling the six-step mode.

2. The method recited in claim 1 wherein the predetermined conditions are:
   when the average DC bus voltage is below the low voltage threshold the sixstep mode is disabled;
   when the average DC bus voltage is above the low voltage threshold and is approaching the high voltage threshold, the six-step mode is disabled;
   when the average DC bus voltage reaches and is above the high voltage threshold, the six-step mode is conditionally enabled;
   if the average DC bus voltage is below the high voltage threshold and is approaching the low voltage threshold, the six-step mode is conditionally enabled; and
   when the average DC bus voltage reaches and is below the low voltage threshold, the six-step mode is disabled.

3. A control system for use in controlling an inverter used in an electric vehicle, comprising:
   a torque command input for receiving an applied torque command;
   a sensor for measuring an average DC bus voltage;
   a processor coupled to the torque command input and the sensor for comparing the average DC bus voltage to low voltage and high voltage thresholds defining predetermined conditions, for enabling the six-step mode based upon the applied torque command if the voltage conditions are satisfied such that the six-step mode is indefinitely enabled if the torque command is higher than a high torque threshold, and the six-step mode is enabled for a limited time duration, and then disabled if the torque command is below the high torque threshold.

4. The control system recited in claim 3 wherein the predetermined conditions are:
   when the average DC bus voltage is below the low voltage threshold the six-step mode is disabled;
   when the average DC bus voltage is above the low voltage threshold and is approaching the high voltage threshold, the six-step mode is disabled;
   when the average DC bus voltage reaches and is above the high voltage threshold, the six-step mode is conditionally enabled;
   if the average DC bus voltage is below the high voltage threshold and is approaching the low voltage threshold, the six-step mode is conditionally enabled; and
   when the average DC bus voltage reaches and is below the low voltage threshold, the six-step mode is disabled.

* * * * *